C. B. MILLS.
CORE STRUCTURE FOR DYNAMO ELECTRIC MACHINES.
APPLICATION FILED MAY 9, 1911.

1,046,834.          Patented Dec. 10, 1912.

WITNESSES:
C. L. Belcher
Otto S. Schairer

INVENTOR
Chester B. Mills
BY
Wiley G. Carr
ATTORNEY

UNITED STATES PATENT OFFICE.

CHESTER B. MILLS, OF EAST McKEESPORT, PENNSYLVANIA, ASSIGNOR TO WESTINGHOUSE ELECTRIC AND MANUFACTURING COMPANY, A CORPORATION OF PENNSYLVANIA.

CORE STRUCTURE FOR DYNAMO-ELECTRIC MACHINES.

1,046,834.  Specification of Letters Patent.  Patented Dec. 10, 1912.

Application filed May 9, 1911. Serial No. 626,112.

*To all whom it may concern:*

Be it known that I, CHESTER B. MILLS, a citizen of the United States, and a resident of East McKeesport, in the county of Allegheny and State of Pennsylvania, have invented a new and useful Improvement in Core Structures for Dynamo-Electric Machines, of which the following is a specification.

My invention relates to the core structures of dynamo-electric machines, and particularly to means for securing such structures to shafts or other rotatable or supporting members.

The object of my invention is to provide simple and inexpensive means whereby a laminated core member may be effectively secured upon a shaft or other support which shall be particularly useful when the core member is provided with peripheral slots for conductors extending across the same at angles to their axes, though the invention is susceptible of more extended application.

Figure 1:
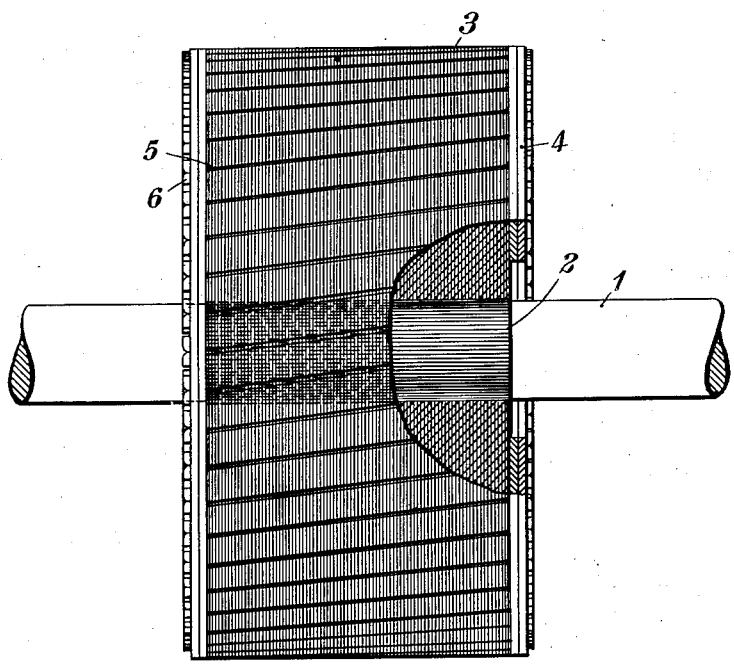
Figure 2:
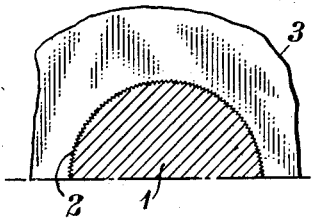

Figure 1 of the accompanying drawing is a view, in side elevation, of the secondary member of an induction motor constructed in accordance with my invention, a portion thereof being broken away for the sake of clearness of illustration, and Fig. 2 is an enlarged end and sectional view of a part of the member shown in Fig. 1.

The member shown comprises a shaft 1 having an intermediate roughened, knurled or ribbed portion 2 that may be conveniently formed by means of a nurling tool. While the surface of this intermediate portion of the shaft may have any suitable configuration, it preferably consists of a plurality of very small, closely adjacent longitudinal ribs.

Mounted upon the roughened intermediate portion of the shaft, is the core member 3, which consists of a suitable number of plates or laminæ that are clamped together between end members 4 and are provided with longitudinal peripheral slots 5 for the reception of conducting bars 6 the ends of which are upset or headed against the end plates and make good electrical connection therewith. The member is thus adapted to be used as the secondary member of an induction motor. It will be understood, however, that the invention is not limited to such specific application but may be employed, also, in the manufacture of direct current armatures or wherever it is desirable to secure a plurality of plates or punchings upon a shaft or other support. The core member is applied to the shaft by pressure and the plates or laminæ are thus caused to closely engage the roughened or knurled portion of the shaft and to embed or partially seat themselves in the recesses between the ribs or other projections. If the roughened portion of the shaft consists of longitudinal ribs, there is less liability of tearing or otherwise injuring the plates or laminæ when applying the core to the shaft and a more secure mounting is thus obtained.

The invention is particularly useful when the peripheral core slots extend at angles to the axis of the core member, since it obviates, in any case, the necessity of providing the core member and the shaft with keyways for the reception of keys, as has heretofore been customary. When such keyways have been provided in the core member by punching out small portions of the plates, the skewing of the core slots necessitated the employment of a skewed key-way in the shaft, which is entirely impractical when the shafts are of small diameter. The key-ways have, accordingly, usually been made in the core member after assembling of its plates in order that the same be parallel to its axis. This has required extra labor and material and has resulted in a much more expensive structure than the one herein set forth.

I claim as my invention:

1. The combination with a shaft having a knurled portion, of a core member comprising a plurality of plates mounted upon the knurled portion of the shaft and making a close self adjusting fit therewith.

2. The combination with a shaft having a longitudinally knurled portion, of a core member comprising a plurality of plates mounted upon the knurled portion of the shaft and making a close self adjusting fit therewith.

3. The combination with a shaft having a large number of thin shallow ribs extending longitudinally thereof, of a core member comprising a plurality of plates mounted upon the ribbed portion of the shaft and making a close self adjusting fit therewith.

4. The combination with a shaft having a knurled portion, of a core member comprising a plurality of plates mounted upon the knurled portion of the shaft and making a close self adjusting fit therewith, the core member having peripheral slots extending across the same at angles to its axis.

5. The combination with a shaft having a plurality of ribs extending longitudinally thereof, of a core member comprising a plurality of plates mounted upon the ribbed portion of the shaft and making a close self adjusting fit therewith, the core member having peripheral slots extending across the same at angles to its axis.

In testimony whereof, I have hereunto subscribed my name this 24th day of April, 1911.

CHESTER B. MILLS.

Witnesses:
  STANLEY STROUD,
  B. B. HINES.